Figure 1:
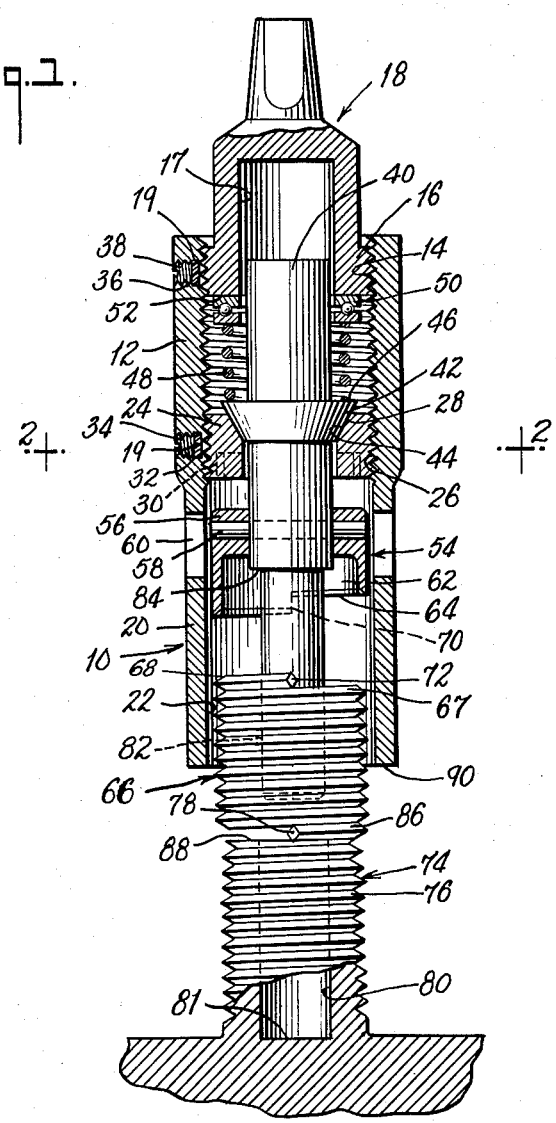

June 26, 1962   L. J. BRANCATO   3,040,423
ASSEMBLY TOOL FOR EXTERNAL SCREW THREAD WIRE COIL ELEMENTS
Filed Aug. 1, 1960

INVENTOR.
LEO J. BRANCATO
BY Walter S. Blenton

ATTORNEY

United States Patent Office 3,040,423
Patented June 26, 1962

3,040,423
ASSEMBLY TOOL FOR EXTERNAL SCREW THREAD WIRE COIL ELEMENTS
Leo J. Brancato, Danbury, Conn., assignor to Heli-Coil Corporation, Danbury, Conn., a corporation of Delaware
Filed Aug. 1, 1960, Ser. No. 46,446
10 Claims. (Cl. 29—240.5)

The invention relates to an assembly tool for external screw thread wire coil elements. In certain types of screw connections in which a male screw thread member and a female screw thread member are to be connected, intermediate screw thread forming wire coil inserts are used which are installed in the female member so as to form an inner thread for a male member such as a screw or bolt. In other types of screw connections it is necessary to apply the wire coil as an external screw thread forming element to a male member or boss before the female member can be screwed on or before the male member with the wire coil element thereon can be screwed into the female member. Such external screw thread forming wire coils are denoted by the trade as "exserts" in contradistinction to the afore-mentioned "inserts" which are destined to line a female member. In most of the cases here under consideration, i.e. where exserts are to be used, the male member will be of a relatively soft material the thread of which is to be reinforced by the hard wire coil exsert. Thus, e.g. a boss of aluminum may be externally threaded, but as the soft material does not stand a repeated screwing on and off of a nut or other female member, a wire coil exsert will be installed in the thread of the boss to stay there for good whereas the nut can be repeatedly applied to and remove from the exsert without damage to any one part of the connection.

Exserts have other uses too, for instance, if a boss has a non-standard thread and the exsert is applied to form a standard thread with its outer screw thread forming portion. Also in order to restore or replace the damaged thread of a boss member an exsert is useful in many instances.

In order, however, to ensure that the wire coil exsert is not shifted on the male member when the female member engages the exsert, it is necessary that the exsert coil with its inner screw thread forming portion is originally slightly undersized in relation to the thread on the male member. In its application, such an exsert must be expanded sufficiently to allow its screwing on the thread of the male member. The exsert will then when finally installed, springingly wedge in the thread groove of the male member so as to set up a very high friction between the male member and the exsert which will be greater than the friction between the exsert and the female member when the latter is being screwed on or off.

However, in order to expand the exsert as necessary, a special tool must be used and it is an object of the present invention to provide a tool for that purpose.

It is another object of the invention to provide a tool comprising means to engage the trailing end of an exsert coil so as to transmit thereto a torque tending to expand or widen the exsert coil when a resistance to turning is set up at the leading coil end.

The invention further aims to provide a tool of the mentioned type with a disengageable clutch between a driving and a driven part and with means automatically to disengage the clutch when the driven part abuts against a surface of a boss thereby to limit the distance the exsert will be screwed on the boss.

The invention also aims to provide means to prevent an excessive expansion of the coil.

Figure 2:
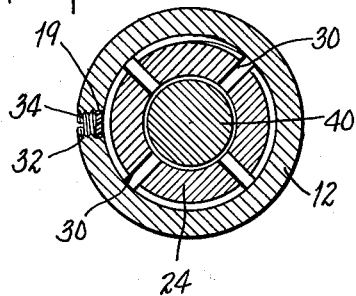

Further objects and details of the invention will be apparent from the description given hereinafter and the accompanying drawing illustrating an embodiment thereof by way of example. In the drawing:

FIG. 1 is a longitudinal cross-section of a tool according to the invention, and
FIG. 2 is a section along line 2—2 in FIG. 1.

Referring now to the drawing, the illustrated tool comprises a sleeve 10 having one end portion 12 which is interiorly screw threaded at 14. This end is screwed on the outer screw thread of the hollow end portion 16 of a driving instrumentality which may either be the correspondingly shaped end of a prime mover shaft or it may be part of an adapter as shown and generally denoted by 18. The major opposite end portion 20 has a cylindrical inner face 22 the diameter of which is according to the outer diameter to which the exsert to be installed with the tool is to be expanded, as it will be described later on. A driving clutch member 24 consisting of a ring with an outer screw thread 26 and a conical clutching surface 28 is screwed into the sleeve portion 12. The clutch ring has four slots 30 in its face opposite the surface 28 for the application of a tool when it is to be turned in relation to the sleeve for an adjustment of its axial position. An internally screw threaded bore 32 is provided in the sleeve portion 12 in the range of the clutch ring for inserting a set screw 34 in order to secure the ring 24 in its adjusted position. Similarly, a threaded bore 36 is provided in the sleeve portion 12 closer to its ultimate end for a set screw 38 securing an adjusted position of the sleeve relatively to the driving instrumentality or adapter 18. Plastic plugs 19 may be provided at the ends of the set screws between the latter and the clutching ring 24 and the part 16, respectively.

Interiorly of and coaxially with the sleeve 10, a spindle 40 is arranged which engages with its upper end in a bore 17 of the part 16. The spindle has secured thereto or integral therewith a driven clutch member 42 for cooperation with the driving clutch member 24. For this purpose the member 42 has a conical surface 44 for engagement with the surface 28. The clutch member 42 forms a shoulder 46. A compression spring 48 bears with its one end on the shoulder 46 and with its other end on an anti-friction bearing 50 which in turn rests against the end face 52 of the driving instrumentality or adapter 18. Thus, by screwing the sleeve 10 in relation to that instrumentality or by screwing the clutch ring 24 in relation to the sleeve 10 the compression of the spring 48 and thereby the clutching force can be adjusted within limits. A driving bit 54 is secured to the spindle 40. The driving bit forms a hollow cylinder. The cylinder end portion 56 facing the clutch member 42 fits the spindle 40 and is secured thereto by a drive pin 58. In order to be able to insert the pin 58, which has to be done when the spindle 40 is already in the illustrated position, one hole 60 or two opposite holes may be provided in the sleeve portion 20. The hole or holes 60 are elongated in order to render different bits of different shapes and sizes interchangeable. The cylinder portion 62, adjacent the portion 56 is wider than the latter and has a free edge 64 of a wall thickness according to the width e.g. the difference of the lengths of the outer and inner radii of the outer thread forming portion of an exsert for the installation of which the tool is destined. Such an exsert is shown at 66 having e.g. a diamond shaped cross-section of the exsert wire, and its outer thread forming portion is denoted by 68. The edge 64 is helically shaped and forms a step 70 which is eccentrical with respect to the spindle 40 so that the end convolution 67 of the exsert can fittingly engage that edge and the ultimate end 72 can engage the step 70 whereby a torque can be exercised at the exsert end through the tool in the direction of the winding of the exsert.

Now it is assumed in the illustrated example that the exsert is to be installed on a boss 74 having an external thread 76 of a nominal diameter slightly larger than the diameter of the inner thread portion 78 of the exsert. The boss may be provided with an axial bore 80 with a bottom 81 in which event the spindle 40 may be equipped with a pilot extension 82 fitting the bore 80 and being of such a length that it hits the bottom 81 when the exsert 66 has been screwed the desired length on the boss. Otherwise the spindle 40 may have its lower end at 84 which will co-operate with the end face 88 of the boss in a similar manner to that just mentioned with respect to the pilot end and the bottom 81 of the bore 80. In order to install the exsert 66 on the boss, it is placed on the latter in the position shown so that the leading end convolution 86 bears on the end face 88 of the boss. Thereupon the tool will be lowered so that the pilot end enters the bore 80, and the sleeve end 90 is approximately on the level with the end face 88 of the boss. In this position, the convolution 67 engages the edge 64 as the length between that edge and the sleeve end 90 is approximately equal to the length of the exsert. Such a length is preferably selected in order, on the one hand, to prevent the exsert from buckling and, on the other hand, to limit the size to which the exsert is to be expanded. The tool will now be turned so that the exsert end 72 bears against the step 70. When, then, the tool is further turned while axial pressure is exerted on the exsert, the leading end of the exsert will be prevented from following owing to the friction between the end convolution 86 and the end face 88 of the boss and owing to the impossibility of the narrower end convolution to enter the wider thread of the boss 74. In consequence, the turning of the tool will cause an expansion of the exsert, starting from the trailing end convolution and gradually extending downward until also the leading end convolution 86 is expanded and engages into the thread 76. From that point on, the turning of the tool will screw the exsert on the boss. This screwing operation continues until the pilot end bears on the bottom 81 of the bore 80, or in the event there is no pilot end, until the spindle end 84 bears on the boss surface 88. When this happens, any further movement of the tool will cause a lifting of the clutch member 42 from the ring 24 against the restraint of the spring 48 with the result that the exsert cannot be screwed on any further. It will also be noticed that an excessive torque cannot be exercised on the exsert because of the spring 48 which will allow a slipping of the clutch elements 24 and 42 in relation to each other when the torque overcomes the friction of these elements.

It has been stated that the adjustability of the sleeve 10 in relation to the part 16 and of the ring 24 in relation to the sleeve serves the purpose of varying the compression of the spring 48. It is, of course, possible to rely for this purpose only on an adjustability of the sleeve 10 in which event the ring 24 may be in a fixed position to or integral with that sleeve, and the set screw 34 may be omitted.

It will be apparent to those skilled in the art that many alterations and modifications may be made of the structure illustrated and described without departure from the essence and spirit of my invention which for that reason shall not be limited but by the scope of the appended claims.

I claim:

1. A tool for assembling an external wire coil exsert having inner and outer screw thread forming portions to a boss member provided with an outer thread of a nominal diameter slightly larger than that of the inner screw thread portion of the wire coil, comprising a sleeve having a first end portion adapted to be affixed to a peripherally and axially driving instrumentality and a major hollow cylindrical, second end portion of an inner width to which said wire coil is to be expanded for installation on the thread of said boss, a driving clutch member interiorly of and secured to said sleeve at a distance from said first end of the latter, a shoulder-provided spindle interiorly of said sleeve and including a driven clutch member for co-operation with said driving clutch member, a thrust bearing inside said sleeve and adapted to bear against said driving instrumentality, a compression spring between said bearing and said shoulder so as to urge said driven clutch member yieldingly into engagement with said driving clutch member, and a hollow cylindrical bit member interiorly of said second sleeve portion and fixed to said spindle, said cylindrical bit having a helical end face substantially fitting the surface of outer thread forming portion of the trailing end convolution of an exsert to be installed, and forming a step for engagement with the trailing end of said exsert.

2. A tool as in claim 1, said spindle including means for abutting against a surface of said boss when said exsert has been screwed a predetermined length on said boss, thereby to disengage said clutch upon further movement of said sleeve.

3. A tool as in claim 1 wherein said driving clutch member is adjustable as to its distance from said first sleeve end.

4. A tool as in claim 1 wherein said sleeve is adjustable as to the spacing between said ultimate first sleeve end and said bearing.

5. A tool as in claim 1 wherein said sleeve is provided with an inner screw thread throughout said first end portion and screwed on said driving instrumentality, and said driving clutch member is provided with an outer thread engaging the inner thread of said sleeve, said sleeve being provided with interiorly threaded bores, set screws respectively received in said bores and engaging said instrumentality and said driving clutch member, in order to fix the relative positions of the sleeve to said instrumentality and of said driving clutch member to said sleeve.

6. A tool as in claim 1, further comprising a pin passed through said bit member and said spindle to secure said bit member to the latter, said sleeve being provided with at least one bore through which said pin can be installed, said bore being elongated in the axial direction to allow for interchangeability of differently sized bits.

7. A tool as in claim 1 wherein said clutch is a conical friction clutch.

8. A tool as in claim 1, said spindle including a pilot end for engagement in an axial bore of said boss and for abutting on the bottom of said bore thereby to disengage said clutch when said sleeve continues to move.

9. A tool as in claim 1, said sleeve extending between said helical face of said bit and the free end of said second end portion substantially according to the length of exsert to be installed.

10. A tool for assembling an external wire coil exsert having inner and outer screw thread forming portions to a boss member provided with an outer thread of a nominal diameter slightly larger than that of the inner screw thread portion of said wire coil, comprising a sleeve having a first end portion adapted to be affixed to a peripherally and axially driving instrumentality and a hollow cylindrical, second end portion of an inner width to which said wire coil is to be expanded by the application of said tool for installation of said coil on the thread of said boss, a driving clutch member interiorly of and secured to said sleeve at a distance from said first end of the latter, a spindle interiorly of said sleeve and including a driven clutch member for cooperation with said driving clutch member, a compression spring between said instrumentality and said driven clutch member so as to urge the latter yieldingly into engagement with said driving clutch member, and a means secured to said spindle concentrical thereof said means having a portion displaced from the axis of said spindle and including an abutment adapted to engage the ultimate trailing end of said coil while the leading coil end engages said boss member, thereby to expand said coil by a torque transmitted from said spindle through said means to said trailing coil end and to screw the expanded coil on said boss.

References Cited in the file of this patent

UNITED STATES PATENTS

| | | |
|---|---|---|
| 776,737 | Greenfield | Dec. 6, 1904 |
| 1,333,436 | Monroe | Mar. 9, 1920 |
| 2,210,353 | Barnes | Aug. 6, 1940 |
| 2,527,517 | Barker et al. | Oct. 31, 1950 |
| 2,869,224 | Forster | Jan. 20, 1959 |
| 2,872,004 | Barker et al. | Feb. 3, 1959 |
| 2,969,588 | Stephens | Jan. 31, 1961 |